March 4, 1958  R. E. DE HAAN  2,825,548
WEIGHING APPARATUS
Filed March 24, 1954  2 Sheets-Sheet 1

Inventor.
Ritzo E. de Haan
By: Marzall, Johnston, Cook & Root
Attys.

March 4, 1958 R. E. DE HAAN 2,825,548
WEIGHING APPARATUS
Filed March 24, 1954 2 Sheets-Sheet 2

Inventor
Ritzo E. de Haan
By: Marzall, Johnston, Cook & Root.
attys

United States Patent Office 2,825,548
Patented Mar. 4, 1958

2,825,548

WEIGHING APPARATUS

Ritzo E. De Haan, Rotterdam, Netherlands, assignor to U. S. Slicing Machine Company, Inc., La Porte, Ind.

Application March 24, 1954, Serial No. 418,330

Claims priority, application Netherlands March 27, 1953

2 Claims. (Cl. 265—56.5)

This invention relates to a weighing apparatus in which the load is partly or completely balanced by a poise settable on a lever by means of a drive shaft journalled into the frame of the apparatus and through a universal joint positioned on or near the axis of rotation of the lever.

A similar weighing apparatus is described in U. S. Patent 1,347,206. In this patent the driving shaft is, however, simply connected with a universal joint on or near the axis of rotation and leading to a screw spindle adapted to set the poise.

This construction has the disadvantage that an imperfect centering of the universal joint may cause the drive shaft when rotated not only to transmit a torque to the screw spindle but also a motion impulse to the lever itself, so that the latter is not returned to equilibrium gradually but with oscillations or shocks, causing the apparatus not to answer its purpose.

Also, if the centre of the universal joint imperfectly coincides with the axis of rotation of the lever, some component of the frictional resistance of the journalling means of the driving shaft may impede the movements of the lever causing the weighing mechanism to become insensitive.

In the weighing apparatus of the invention this drawback is eliminated by a flexible connection between the driving shaft journalled into the frame of the weighing apparatus and the universal joint positioned on or near the axis of rotation of the lever. In an embodiment of the invention this flexible connection comprises another universal joint connecting the driving shaft journalled into the frame to an intermediate shaft leading to the first universal joint.

In case of the poise being hand-actuated the construction of the invention has the advantage of allowing a return of the weighing apparatus to equilibrium, or to any other position desired, without shocks or oscillation. If, however, the poise is controlled by a servo-motor, the advantage is that the servo-motor can be positioned on the frame of the weighing apparatus.

The invention will now be further described with reference to a diagrammatical representation of some embodiments of the weighing apparatus according to the invention.

Figure 1 is a perspective view of a lever with poise.

Figures 2 and 3 diagrammatically show a longitudinal section and an elevation respectively, of another embodiment.

Figure 1:
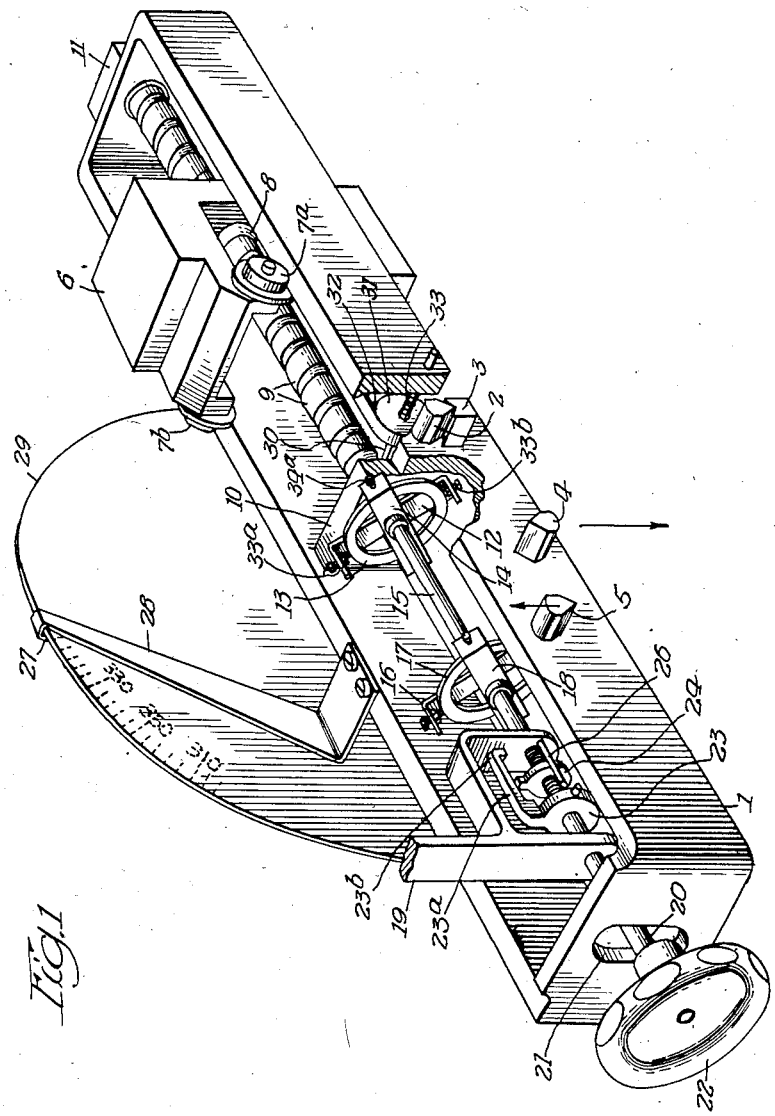

The poise lever 1 is constructed as a frame in the walls of which the knives are positioned. Knives 2 are supported by bearings 3 and are arranged in line. Only the front knife is shown.

The load L works on knives 4 arranged in line, while other knives 5 may be provided when part of the load is balanced by an automatic balancing device. A pull rod acts on the knives 5 and forms the connection with the automatic balancing device.

A poise 6 moves longitudinally of the lever 1 and bears thereon with rollers 7a and 7b. A nut segment 8 is provided on the poise to cooperate with a screw spindle 9 one end of which is journalled into an end surface of the lever and the other end into a transverse member 10 of it. The screw spindle 9 when rotated causes the poise 6 to move along lever 1. A blade spring 11 fixed on an end surface of the screw spindle urges the longitudinal backlash of the screw spindle to one side. The poise has a three point support with rollers 7 and the nut segments 8.

The end of the screw spindle extending through the transverse element 10 carries a U-shaped bracket 12 into the legs of which the aligned trunnions 33a and b are fixed by means of bolts, while they extend through coaxial bores of ring 13 of a Hooke's joint.

Substantially perpendicular to bracket 12 another bracket 14 is rigidly connected to a spindle 15. The latter bracket also carries trunnions 34a and b arranged in line (34b is not shown in the drawing). These trunnions extend through coaxial bores of the ring 13 of the Hooke's joint. This device forms a universal joint between the two spindles 9 and 15, so that rotation of spindle 15 also causes a rotation of spindle 9, independent, with certain limits, of the angle between the two shafts.

Thus lever 1 can turn about a certain angle on the knife bearing (2, 3) whilst maintaining the interrelation between spindle 15, which has a substantially fixed position, and screw spindle 9.

The construction as so far described would only answer its purpose if the point of intersection of spindles 9 and 15 would in all circumstances accurately coincide with the knife line of knife bearing 2, 3. In that case the shaft 15 could only impart a torque to screw spindle 9, whereas if this is not the case rotation of the shaft 15 would also cause lever 1 to be given a motion impulse through the journalling of screw spindle 9, in the sense of a tilting movement on the knife bearing 2, 3.

Since it is difficult in practice to cause the main point of the universal joint 12, 13, 14, 33, 34 to accurately coincide with knife line 2, 3, another universal joint 16, 17, 18, 34, 35 of a similar construction is provided. By means of this joint shaft 15 is coupled with a shaft 20 journalled into frame 19 of the weighting apparatus. The shaft extends outwardly through a slot 21 of lever 1 and has a knob 22 at its end.

In order to prevent a torque being imparted by the screw spindle 9 while the poise abuts against the transverse member 10 or the inner end of lever 1, resulting in damage to screw spindle 9 or nut segment 8, a stroke limiting member has been arranged on spindle 20. This member comprises a cam carrier 23 rotating together with spindle 20 and provided with two cams 23a and b as well as a cam disc 24 moving parallel to itself and having a central bore with an internal thread through which the spindle 20, which is locally threaded at 25, extends. Rotation of the cam disc 24 is prevented by the pin 26 fixed to the frame, which slidingly supports the cam disc in a suitable recess.

The cam of cam disc 24 abuts against one of cams 23a or b, when the poise approaches the end of its path.

The position of the poise is shown by an index 27 on a bracket 28 fixed to lever 1, and by a dial 29 which is rotatable about a shaft 30 journalled to the lever 1. The shaft 30 carries a disc 31 round which runs a flexible metal ribbon 32, one end of which is connected to the poise. A spiral spring 33 around the shaft 30 and at one end connected to disc 31 and at the other side to the lever 1, keeps the metal ribbon tight.

Figure 2:
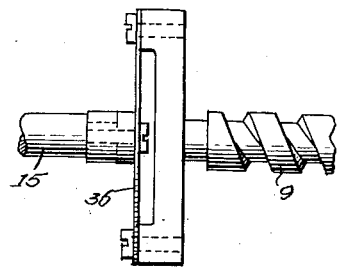
Figure 3:
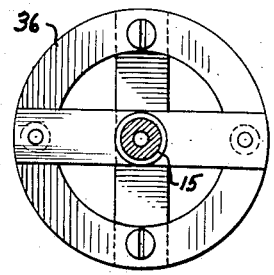

Several variations are possible. Thus, instead of the Hooke's joints 12, 13, 14, 33, 34, and 16, 17, 18, 35, 36 described above, universal joints of other types may be used. It is also possible to establish the connection between the shafts 9 and 15 (or between 15 and 20) by coupling the brackets 14 and 12 by means of a flat ring 36 of spring steel, as indicated in Figures 2 and 3. When the lever makes a tilting movement, the ring 36 is slightly bent. The thickness of the ring should be such that in shifting the poise the screw spindle does not impart a tilting movement to the lever, i. e. the joint has practically the same effect as the true Hooke's joints.

Figure 5:
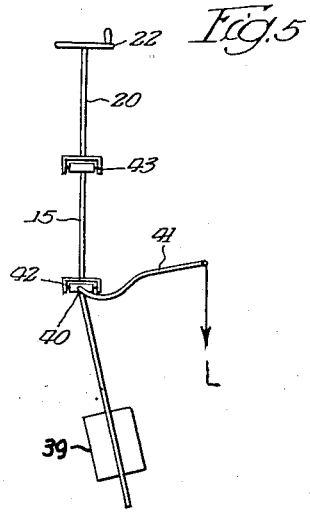
Figure 5 illustrates the application of the invention to a pendulum.
Figure 4:
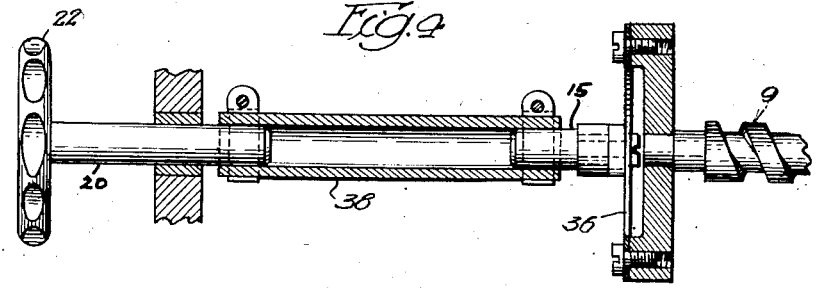
Figure 4 shows a diagram of still another embodiment.

Figure 5 shows how the second universal joint 16, 17, 18 can be substituted by a flexible joint between the spindles 20 and 15, formed by a rubber tube 38 clamped to the spindles.

In Figure 5 the device of the invention is applied to a pendulum with a poise 39. The pendulum can turn round a line through a point 40 and is connected with an arm 41 receiving the load L. In this case in point 36 a universal joint 38 is mounted, said joint being connected to another universal joint 39 by a shaft 15, the second universal joint again being driven by a knob or handwheel 22 and spindle 20. The joint 38 is in some way suitably connected to the pendulum weight 35 as by a screw spindle. Thus the capacity of the pendulum can be altered during weighing. This may be of importance i. e. in regard of scales with price calculation.

It may be observed that instead of a screw spindle other elements may as well be used for driving the poise from the joint 12, 13, 14 or 38 (Figure 3). The poise 6 or 39 may be imagined to be connected with an endless ribbon driven through the joint.

I claim:

1. A weighing apparatus comprising an elongated lever mounted to pivot about a horizontal axis, a poise mounted to move along the lever, a poise positioning means on the lever drivingly associated with the poise, a rotary drive means mounted independently of the lever, a universal joint coupled to the poise positioning means and positioned on the axis about which the lever is mounted to pivot, and a flexible coupling means coupled between the rotary drive means and the universal joint whereby the poise may be moved along the lever by rotation of the rotary drive means and whereby the drive means will impart no motion impulse directly upon the lever.

2. A weighing apparatus comprising a lever assembly mounted to pivot about a horizontal axis, a poise mounted to move along the lever assembly, a shaft rotatably mounted in the lever assembly, said shaft and said poise having cooperating threads whereby the poise will be moved longitudinally of the lever assembly when the shaft is rotated, a rotational drive means mounted independently of the lever assembly, a universal joint coupled to the shaft and positioned on the axis about which the lever is mounted to pivot, and a flexible coupling means connected between the rotational drive means and the universal joint whereby the rotational drive means may rotate the shaft without imparting a force thereto which would disturb the balance of the lever assembly.

References Cited in the file of this patent

UNITED STATES PATENTS

| 1,347,206 | Buckingham | July 20, 1920 |
| 1,827,758 | McKim | Oct. 20, 1931 |
| 1,967,139 | Wilson | July 17, 1934 |
| 2,383,085 | Schmitz | Aug. 21, 1945 |
| 2,630,312 | Carrier | Mar. 3, 1953 |